United States Patent [19]
Gramann et al.

[11] Patent Number: 6,028,708
[45] Date of Patent: Feb. 22, 2000

[54] METHOD FOR PRODUCING A BEAM SPLITTER MOLDED PART AND OPTOELECTRONIC MODULE USING THE BEAM SPLITTER MOLDED PART

[75] Inventors: Wolfgang Gramann, Regensburg; Werner Späth, Holzkirchen, both of Germany

[73] Assignee: Siemens Aktiengesellschaft, Munich, Germany

[21] Appl. No.: 09/282,040

[22] Filed: Mar. 30, 1999

Related U.S. Application Data

[63] Continuation of application No. PCT/DE97/02201, Sep. 26, 1997.
[51] Int. Cl.[7] .................................................. G02B 27/10
[52] U.S. Cl. ........................ 359/629; 359/196; 359/618; 359/900; 359/154
[58] Field of Search .................................... 359/196, 152, 359/154, 155, 173, 629, 638, 639, 640, 833, 837, 900, 618, 222, 124, 127, 129

[56] References Cited

U.S. PATENT DOCUMENTS

4,732,449  3/1988  Fan ............................................. 385/33

Primary Examiner—James Phan
Attorney, Agent, or Firm—Herbert L. Lerner; Laurence A. Greenberg

[57] ABSTRACT

A method is provided for producing at least one beam splitter molded part from transparent material in which a beam splitter layer is embedded. Two radiation-transparent wafers, of which one is provided with a beam splitter layer, are interconnected in such a way that the beam splitter layer lies between the two wafers. Subsequently, this wafer assembly is further processed to form individual prism ingots, for example by sawing them through into wafer strips and grinding or polishing lateral surfaces, or by profile sawing. An optoelectronic module for bidirectional optical data transmission uses the beam splitter molded part.

13 Claims, 5 Drawing Sheets

METHOD FOR PRODUCING A BEAM SPLITTER MOLDED PART AND OPTOELECTRONIC MODULE USING THE BEAM SPLITTER MOLDED PART

CROSS-REFERENCE TO RELATED APPLICATION

This application is a continuation of copending International Application No. PCT/DE97/02201, filed Sep. 26, 1997, which designated the United States.

BACKGROUND OF THE INVENTION

Field of the Invention

The invention relates to a method for producing at least one beam splitter molded part which is transparent to electromagnetic radiation and in which a beam splitter layer is embedded.

Such beam splitter molded bodies, for example prismatic cubes, are known. The known production methods for such prismatic cubes are very complicated and thus cost-intensive. Consequently, the use of prismatic cubes has not so far been envisaged for the production of cost-effective optoelectronic components.

European Patent Application 0 359 658 A2 has disclosed a method for producing a plurality of beam splitter molded parts. The production is performed by sawing using conventional measures at an angle to a configuration of a plurality of wafers disposed in layers one above another.

SUMMARY OF THE INVENTION:

It is accordingly an object of the invention to provide a method for producing a beam splitter molded part and an optoelectronic module using the beam splitter molded part, which overcome the hereinafore-mentioned disadvantages of the heretofore-known methods and devices of this general type and which have as few technically complicated method steps as possible.

With the foregoing and other objects in view there is provided, in accordance with the invention, a method for producing a beam splitter molded part, which comprises:
 a) producing a first wafer, formed of radiation-transparent material;
 b) applying the beam splitter layer to a main surface of the first wafer;
 c) applying a second wafer, formed of radiation-transparent material, to the beam splitter layer;
 d) severing the wafer assembly having the first wafer, the beam splitter layer and the second wafer along separating lines running parallel to one another obliquely or perpendicularly to the beam splitter layer in such a way as to produce bars that are separated from one another and in each case have a first wafer strip and a second wafer strip between which the beam splitter layer is disposed;
 e) grinding and/or polishing each of the first and the second wafer strip of the bars in such a way that the cross-sectional surface, situated perpendicular to the beam splitter layer, of the bars essentially acquires a prescribed corresponding cross-sectional surface of the beam splitter molded part; and
 f) if provided, severing the bars transverse to their longitudinal axis into individual beam splitter molded parts.

With the objects of the invention in view there is also provided a method for producing a beam splitter molded part, which comprises:

a) producing a first wafer, formed of radiation-transparent material;
 b) applying the beam splitter layer to a main surface of the first wafer;
 c) applying a second wafer, formed of radiation-transparent material, to the beam splitter layer;
 d) severing the second wafer and incipiently sawing the beam splitter layer along separating lines, running parallel to one another, through the use of a separating tool with a V-shaped cutting profile, in such a way as to produce first wafer strips separated from one another;
 e) fastening the assembly including the first wafer, the second wafer and the beam splitter layer on a carrier plate in such a way that the first wafer strips face the carrier plate;
 f) severing the first wafer and the beam splitter layer along the separating lines, running parallel to one another, through the use of a separating tool with a V-shaped cutting profile in such a way as to produce second wafer strips separated from one another and situated opposite the first wafer strips, and thus to construct beam splitter molded part ingots separated from one another whose cross-sectional surface situated perpendicular to the beam splitter layer essentially has a prescribed corresponding cross-sectional surface of the beam splitter molded part; and
 g) if provided, severing the bars transverse to their longitudinal axis.

In accordance with another mode of the invention, there is provided a method which comprises after the severing of the second wafer and incipient sawing of the beam splitter layer, at least one of grinding and polishing cut surfaces of the first wafer strips, and after the severing of the first wafer and the beam splitter layer, at least one of grinding and polishing cut surfaces of the second wafer strips.

In accordance with a further mode of the invention, there is provided a method which comprises providing the beam splitter layer with a WDM layer sequence.

In accordance with an added mode of the invention, there is provided a method which comprises using a glass wafer as the second wafer, forming a silicon sublayer of the beam splitter layer, bordering the sublayer on the glass wafer, and connecting the glass wafer to the beam splitter layer by anodic bonding.

With the objects of the invention in view, there is additionally provided an optoelectronic module for bidirectional optical data transmission with an optical device coupled optically to the optoelectronic module, by using a beam splitter molded part, comprising a transmitting component for emitting a beam of radiation; a receiving component for receiving radiation; and a radiation-focusing device for focusing radiation; the transmitting component, the receiving component, the radiation-focusing device and the beam splitter molded part constructed and mutually disposed for coupling at least a portion of the beam emitted by the transmitting component during operation of the optoelectronic module into the optical device, and for coupling at least a portion of a received beam coupled out of the optical device into the receiving component.

In accordance with another feature of the invention, the beam splitter molded part has the shape of a cuboid, the beam splitter layer lies in a diagonal cut surface of the cuboid, and a cut surface of the cuboid lying perpendicular to the beam splitter layer has the shape of a rectangle or a square.

In accordance with a further feature of the invention, the beam splitter molded part has at least a first lateral surface, a second lateral surface and a third lateral surface; the first lateral surface and the second lateral surface are inclined relative to one another; the third lateral surface is inclined relative to one of the first and second lateral surfaces and opposite the other of the first and second lateral surfaces; the transmitting component has a transmitting component beam entrance surface facing the first lateral surface; the receiving component has a receiving component beam entrance surface facing the second lateral surface; the beam-focusing device has a beam entry and beam exit surface facing the third lateral surface; and the beam splitter layer intersects both a beam axis of the emitted beam and a beam axis of the received beam.

In accordance with an added feature of the invention, the first lateral surface and the second lateral surface are mutually perpendicular; and the third lateral surface is mutually perpendicular with one of the first and second lateral surfaces and mutually parallel and opposite the other of the first and second lateral surfaces.

In accordance with an additional feature of the invention, the transmitting component beam entrance surface of the transmitting component is connected to the first lateral surface; the receiving component beam entrance surface of the receiving component is connected to the second lateral surface; and the beam entry and exit surface of the radiation-focusing device is connected to the third lateral surface.

In accordance with yet another feature of the invention, the radiation-focusing device has a carrier part formed substantially of a material transparent to the emitted radiation and the received radiation; a radiation-transparent connecting device connects the carrier part to the beam splitter molded part; and the transmitting component and the optical device are disposed on different sides of the carrier part.

In accordance with yet a further feature of the invention, the beam splitter molded part has a fourth lateral surface; a monitor diode has a monitor diode beam entrance surface facing the fourth lateral surface; and the beam splitter layer is partially transparent to the emitted radiation for permitting a first portion of the emitted radiation to strike the monitor diode beam entrance surface.

In accordance with yet an added feature of the invention, the beam axis of the emitted radiation and the beam axis of the received radiation are substantially parallel; the beam splitter layer is constructed and disposed for passing a portion of the transmitted radiation to be coupled into the optical device and for the most part reflecting and deflecting the received radiation towards the receiving component; and the radiation-focusing device and the transmitting component are disposed on opposite sides of the beam splitter molded part.

In accordance with a concomitant feature of the invention, the beam axis of the transmitted radiation and the beam axis of the received radiation enclose an angle of 90°; and the beam splitter layer is constructed and disposed for at least mostly reflecting the emitted radiation, causing a beam axis of the reflected radiation to run parallel to the beam axis of the received radiation, and for passing at least a portion of the received radiation, causing the received radiation to strike the receiving component beam entrance surface.

Other features which are considered as characteristic for the invention are set forth in the appended claims.

Although the invention is illustrated and described herein as embodied in a method for producing a beam splitter molded part and an optoelectronic module using the beam splitter molded part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS:

Referring now in detail to the figures of the drawings, in which identical or identically acting constituent parts are respectively provided with the same reference numerals, and first, particularly, to FIGS. 1A–1D thereof, there is seen a diagrammatic representation of a method, in which a first step (FIG. 1A) is used to apply a beam splitter layer 10 to a first wafer 80, that is transparent to radiation and is formed, for example, of quartz, borosilicate glass, sapphire, Si, GaP or of another suitable semiconductor material. This beam splitter layer 10 can, for example, be a 3 dB splitter layer or a WDM (Wavelength Division Multiplexing) filter layer which, for example, is constructed as a short-wave passing filter, long-wave passing filter or an attenuating filter. Applying the beam splitter layer 10 is indicated by arrows 91 in FIG. 1A.

Subsequently, (FIG. 1B) there is applied to the beam splitter layer 10 a second wafer 81 transparent to radiation, which is formed, for example, in turn of quartz, borosilicate glass, sapphire, Si, GaP or of another suitable semiconductor material. This wafer 81 is fastened on the beam splitter layer 10, for example through the use of an adhesive (for example thermosetting plastic: epoxy resin, silicone rubber). If the surface, facing the second wafer 81, of the beam splitter layer 10 is a silicon layer (for example a silicon), and the second wafer 81 is made from glass, these two components can be connected through the use of anodic bonding. In this known technique, the two surfaces to be connected are laid on one another, heated, for example to approximately 450° C., and a voltage of, for example, −1000 V is applied to the glass with respect to the silicon.

Thereafter, the assembly composed of the first wafer 80, the beam splitter layer 10 and the second wafer 81 is laminated with a free main surface of one of the two wafers 80, 81 applied onto an adhesion film 92, and severed along separating lines 82, running parallel to one another, perpendicular to the beam splitter layer 10. The severing is performed, for example, through the use of sawing, to provide individual bars 83 that are only interconnected through the adhesion film 92. Each of these bars 83 includes a first wafer strip 84, a beam splitter layer 10 and a second wafer strip 85 (compare FIG. 1C in this regard).

Figure 5:
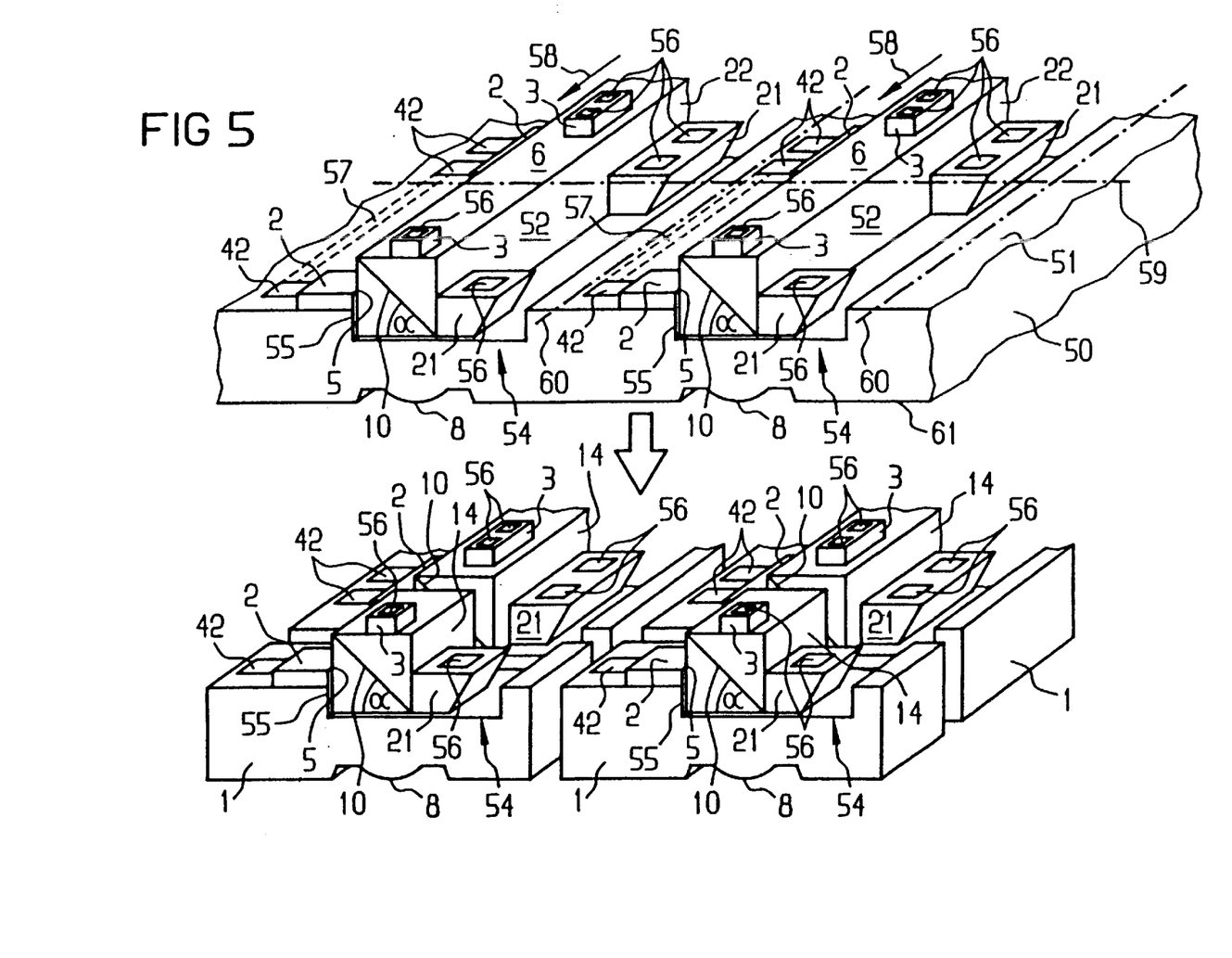
FIG. 5 is a fragmentary, exploded, perspective view provided for the purpose of explaining a method sequence for simultaneously producing a plurality of optoelectronic modules in accordance with FIG. 3.

Subsequently, the cross-sectional surface, situated perpendicular to the beam splitter layer 10, of the bars 83 is brought into the desired shape, for example hexagon, rectangle or square, by grinding and/or polishing the lateral surfaces of the first and second wafer strips 84, 85. This then results, for example, in so-called prism ingots 52 which include a first prism 15, a second prism 16 and a beam splitter layer 10 disposed therebetween. As is shown in FIG. 5, for example, these can then be further processed or be given their final length by sawing off immediately and subsequently further processed.

As an option, the lateral surfaces of the prisms 15, 16 can be coated with a coating material, for example through the use of ion plating or hydrothermal deposition. etc.

Figure 1A:
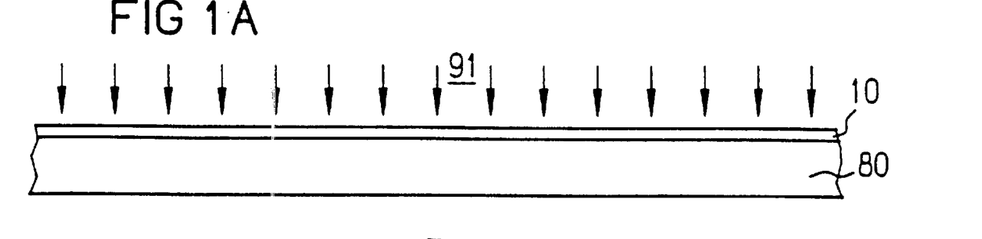
FIGS. 1A–1D are diagrammatic, sectional views representing a sequence of an exemplary embodiment of a first method according to the invention.
Figure 1B:
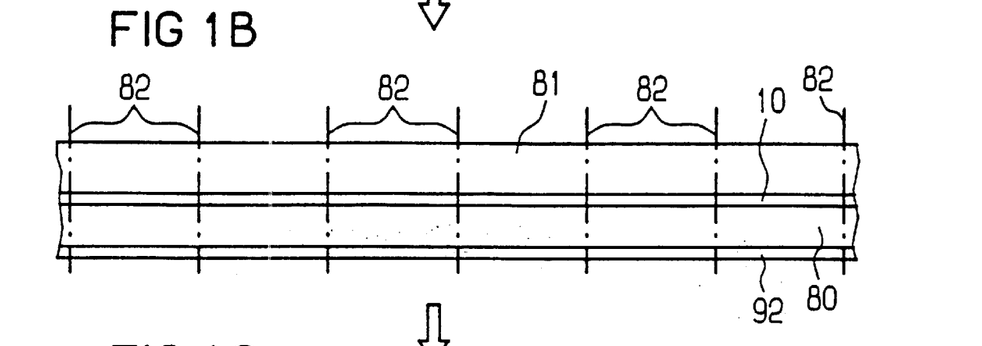
Figure 1C:
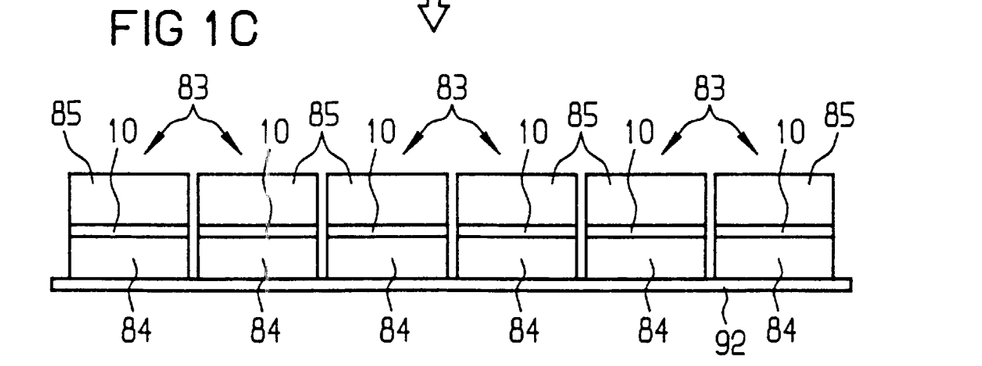
Figure 1D:
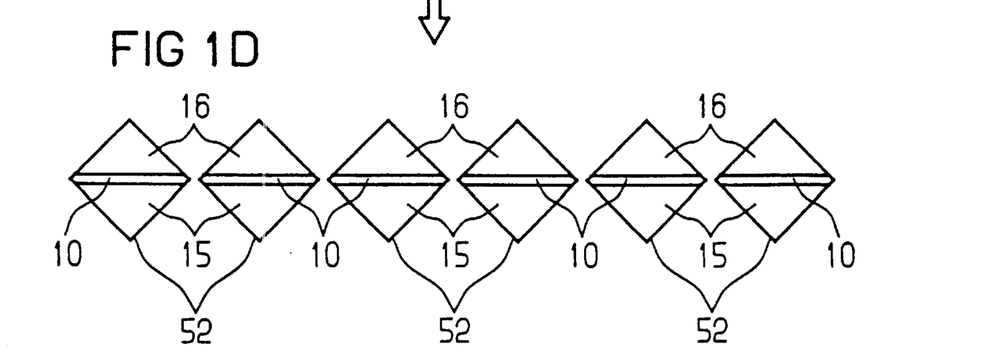
Figure 2A:
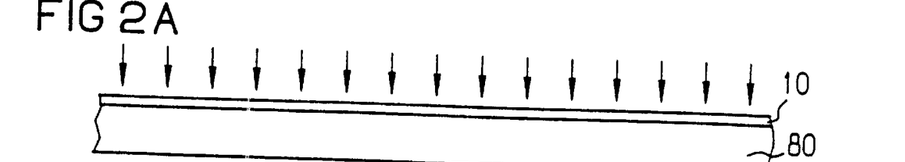
FIGS. 2A–2E are sectional views representing a sequence of an exemplary embodiment of a second method according to the invention.
Figure 2B:
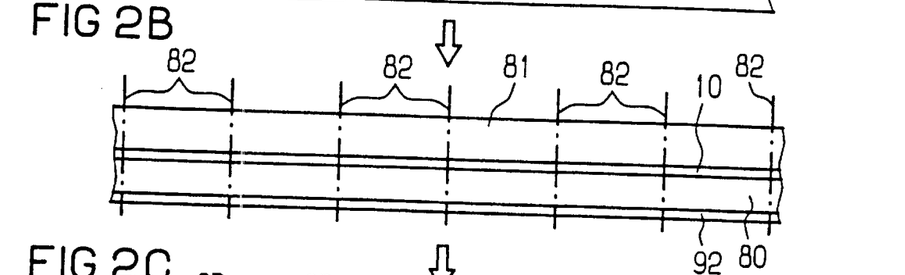
Figure 2C:
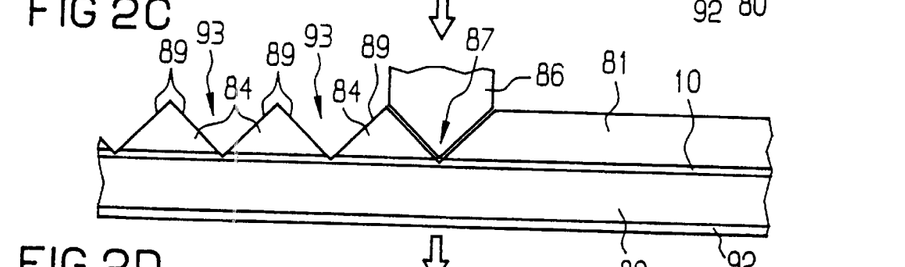
Figure 2D:
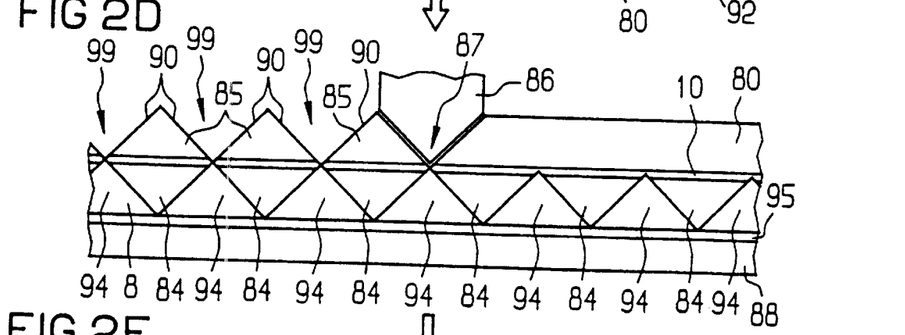

The method represented in FIG. 2 differs from the aforementioned method in particular in that after the assembly has been bonded onto the adhesion film 92 (FIG. 2B), the wafer 81 disposed on the side, situated opposite thereto, of the beam splitter layer 10 is provided with a V-shaped cutting profile 87 with adjoining first V-grooves 93 through the use of a saw blade 86 (FIG. 2C). The first V-grooves 93 reach as far as into the beam splitter layer 10. Thereafter, the assembly is fastened on a carrier plate 88, for example through the use of wax 94, in such a way that the side, provided with the first V-grooves 93, of the assembly faces the carrier plate. A paper layer 95, for example, is located on the carrier plate 88 between the carrier plate 88 and the assembly.

The next step (FIG. 2D) is to provide the wafer 80 exactly centrally with respect to the first V-grooves, and likewise through the use of a saw blade 86, with the V-shaped cutting profile 87 with adjoining second V-grooves 99 that likewise reach into the beam splitter layer 10 and sever the latter. This produces a plurality of prism ingots 52 which essentially have the final shape of the cross-sectional surface, situated perpendicular to the beam splitter layer 10, of the envisaged beam splitter molded part.

Figure 2E:
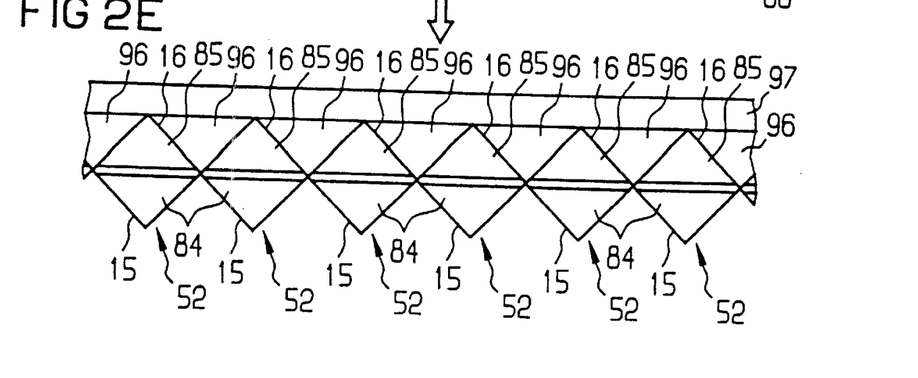

In order to fix the prism ingots 52 in an ordered assembly for further method steps, the prism ingots 52 while still fixed on the carrier plate 88 are fastened on a holding bar 97, for example through the use of an epoxy resin 96 (FIG. 2E). Thereafter, the assembly is detached from the carrier plate 88, while constructing a plurality of individual prism ingots 52 fastened on the holding bar 97. The prism ingots can then be further processed as desired, for example through the use of severing the prism ingots 52 to form prism cubes or prism cuboids or, as shown in FIG. 5, by applying them to a substrate wafer in order to produce optoelectronic modules.

A particular advantage of the method according to the invention described above is that it is possible to produce a plurality of beam splitter molded parts with any desired cross-sectional surface in the wafer assembly, that is to say during use.

As an option, it is also possible in this case for the lateral surfaces of the prisms 15, 16 to be coated with a coating material, for example through the use of ion plating or hydrothermal deposition.

Of course, it is possible to use the above-described methods to produce not only beam splitter molded bodies of square cross section but, by changing the grinding/polishing processes and/or the saw blade profile, the most varied cross-sectional surface shapes such as, for example, rectangular, hexagonal, etc.

Figure 3:
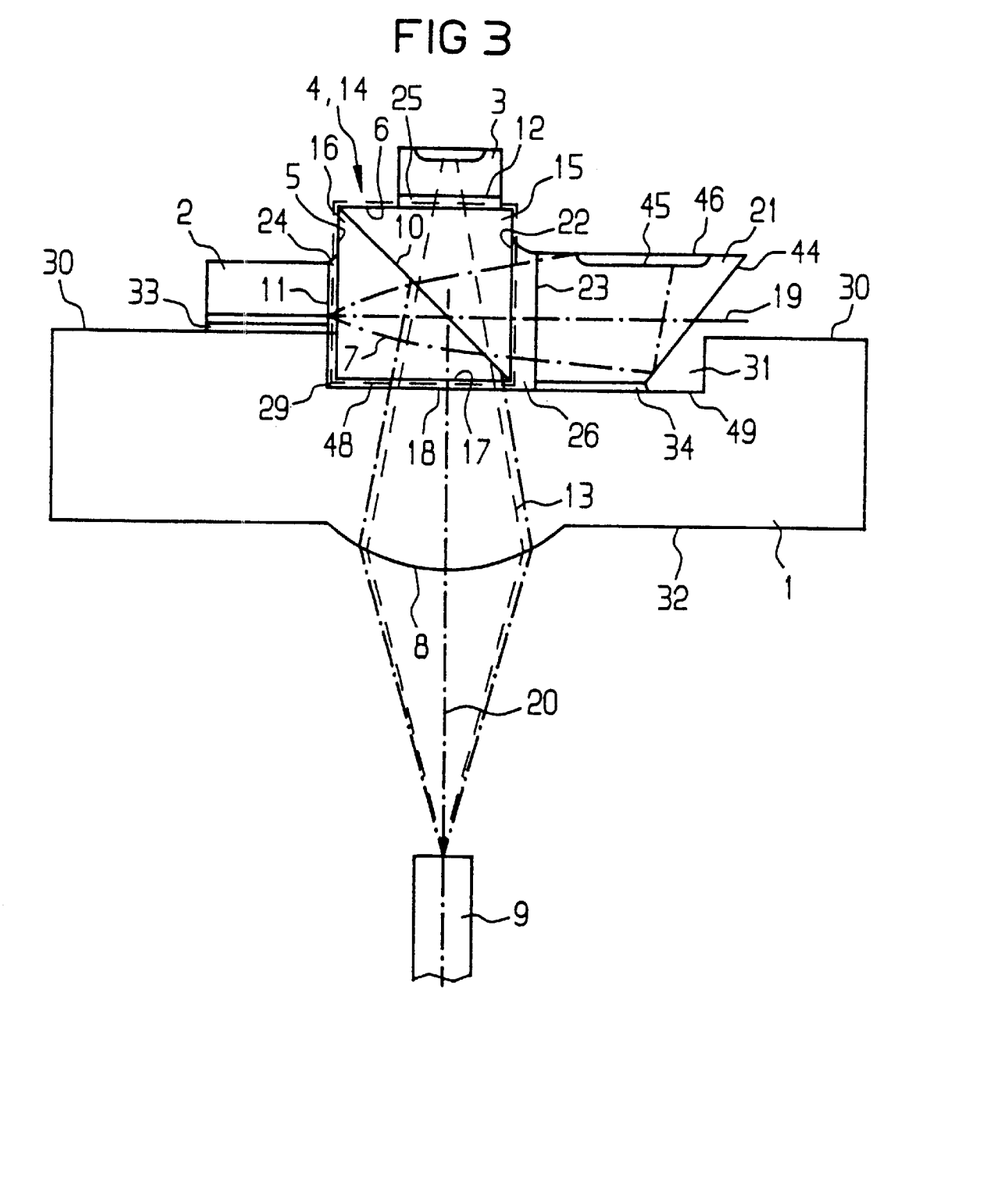
FIG. 3 is a diagrammatic, sectional view of a first optoelectronic module having a beam splitter molded part produced by using the method according to the invention.

The optoelectronic module of FIG. 3 has a carrier part 1 with first and second oppositely disposed main surfaces 30, 32. The first main surface 30 has a cutout 31 and the second main surface 32 has a radiation-focusing device 8 for focusing radiation, in this case a spherical positive lens. A beam splitter molded part, in this case a prismatic cube 14, acting as a beam splitter device 4, is fastened on a base surface 49 of the cutout 31 with the aid of a connecting device 29 that is transparent to radiation, for example a transparent adhesive. The prismatic cube 14 includes two optical prisms 15, 16 which are joined together and between which the beam splitter layer 10 is disposed. The beam splitter layer 10 lies on a diagonal plane of the prismatic cube 14. Of course, this exemplary embodiment is not limited exclusively to the use of a prismatic cube 14. It is likewise possible to make use instead of the prismatic cube of, for example, a prismatic cuboid having a square or rectangular cut surface lying perpendicular to the beam splitter layer 10.

Figure 4:
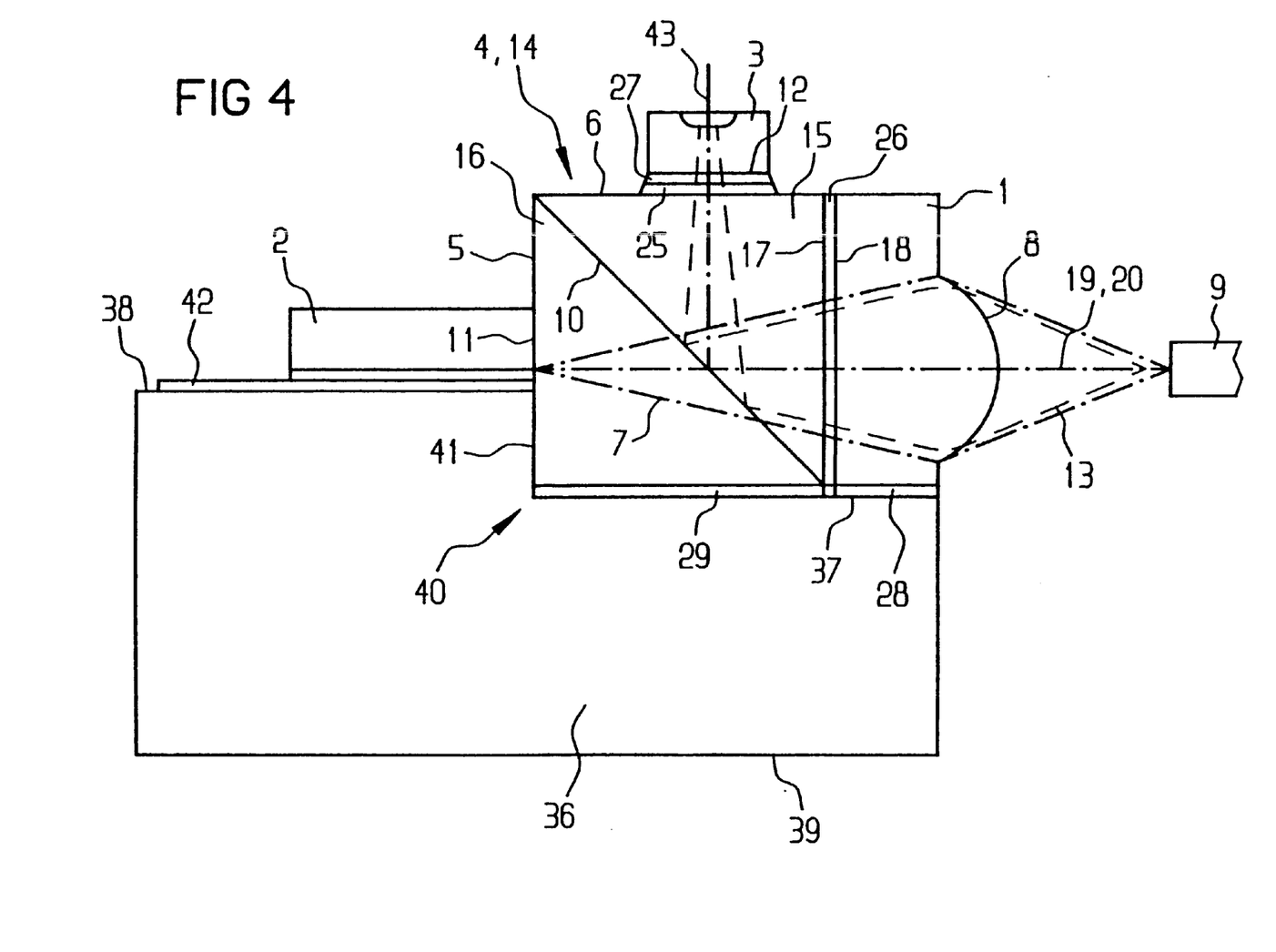
FIG. 4 is a sectional view of a second optoelectronic module having a beam splitter molded part produced by using the method according to the invention.

A transmitting component 2, for example a Fabry-Perot laser or a DFB laser, that is to say an edge emitter, is fastened on the first main surface 30 of the carrier part 1 next to a first lateral surface 5 of the prismatic cube 14. This is done in such a way that a transmitting component beam entrance surface 11 of the transmitting component 2 lies parallel to the first lateral surface 5 of the prismatic cube 14. A solder or an adhesive is used, for example, as a connecting device 33 between the transmitting component 2 and the carrier part 1. As is shown in FIG. 4 and FIG. 5, as an option, structured metallic layers 42 are applied to the first main surface 30 of the carrier part 1. The structured metallic layers 42 are connected to electric terminals of the transmitting component 2 and serve as external electric terminals for the transmitting component 2. For this purpose, the transmitting component 2 can rest directly with its electric terminals on the metallic layers 42 and be connected to the latter in an electrically conducting fashion, for example through the use of a solder.

The transmitting component beam entrance surface 11 can optionally rest directly on the first lateral surface 5 of the prismatic cube, or be disposed at a spacing therefrom. In the second case, the interspace between the beam entrance surface 11 and the first lateral surface 5 of the prismatic cube 14 can, as shown in FIG. 3, be filled with a coupling medium 24 which is transparent to radiation and whose refractive index is raised with respect to that of air. Consequently, reflection losses based on strongly differing refractive indices of air and semiconductor material or the material of the prismatic cube are reduced. Ideally, the transmitting component beam entrance surface 11 makes physical contact with the first lateral surface 5.

A receiving component 3, for example a photodiode, is fastened with the aid of a connecting device 25 that is transparent to radiation on a second lateral surface 6 of the prismatic cube 14 lying perpendicular to the first lateral surface 5 and parallel to the first main surface 30 of the carrier part 1. A receiving component beam entrance surface 12 of the receiving component 3 faces the second lateral surface 6. Ideally, the receiving component beam entrance surface 12 in turn makes physical contact with the second lateral surface 6. The prismatic cube 14 is disposed in such a way that the beam splitter layer 10 lies in a plane which is disposed between the transmitting component 2 and the receiving component 3 and which encloses an angle of 45° with the first main surface 30 of the carrier part 1.

On the side of the prismatic cube 14 situated opposite the transmitting component 2, a monitor diode 21 is likewise fastened in the cutout 31 of the carrier part 1 with the aid of a connecting device 34, for example a metallic solder or an adhesive. This monitor diode 21 serves essentially to check the wavelength of radiation 7 emitted by the transmitting component 2. For this purpose, the beam splitter layer 10 is constructed in such a way that it passes a portion of the radiation 7 being emitted.

The monitor diode 21 is disposed in such a way that a monitor diode beam entrance surface 23 faces a fourth lateral surface 22, situated opposite the first lateral surface 5, of the prismatic cube 14. An interspace between the fourth lateral surface 22 of the prismatic cube 14 and the monitor diode beam entrance surface 23 is filled through the use of a transparent coupling medium 26, for example a transparent epoxy resin. As a result, reflection losses in the radiation can be reduced in turn on the path to the monitor diode 21.

A lateral surface 44, situated opposite the monitor diode beam entrance surface 23, of the monitor diode 21 is beveled in such a way that it reflects at least a portion of the radiation penetrating into the monitor diode 21 towards a radiation-detecting pn junction 45 of the monitor diode 21. It encloses an angle of less than 90° with a lateral surface 46 of the monitor diode which lies closest to the pn junction 45. In addition, it can be provided, for example, with a reflection-increasing layer.

The transmitting component 2, the receiving component 3, the prismatic cube 14 and the radiation-focusing device 8 are constructed and disposed relative to one another in such a way that after passing through the radiation-focusing device 8, during operation of the optoelectronic module, at least a portion of the beam 7 emitted by the transmitting component 2 is coupled into an optical device 9 which is disposed downstream of the radiation-focusing device 8, as viewed in the propagation direction of the emitted beam 7. In addition, after passage through the radiation-focusing device 8 and through the prismatic cube 14, at least a portion of a received beam 13 coupled out of the optical device 9 is coupled into the receiving component 3.

For this purpose, the prismatic cube 14 is fabricated from a material that is transparent to the emitted beam 7 and the received beam 13 (for example quartz, borosilicate glass, sapphire or semiconductor material (compare for this purpose, for example, the semiconductor materials specified below for the carrier part)). The beam splitter layer 10 is constructed in such a way that it for the most part reflects the emitted beam 7 and as far as possible passes the received beam 13. Such beam splitter layers 10 are known in optical engineering, for example 3 dB splitter or WDM (Wavelength Division Multiplex) filters, and for this reason are not explained in more detail at this juncture. As an option, an antireflection coating 48 (drawn in with dashes) is applied to the lateral surfaces 5, 6, 17, 22 of the prismatic cube.

A beam axis 19 of the emitted beam 7 and a beam axis 20 of the received beam 13 are perpendicular to one another in this exemplary embodiment.

It may be mentioned at this juncture for the sake of completeness that the emitted beam 7 and the received beam 13 advantageously have different wavelengths $\lambda$. This holds for all of the exemplary embodiments of the optoelectronic module according to the invention which are described in this application.

As is indicated in FIG. 3, the optical device 9 is, for example, an optical fiber, a lens configuration or a further optoelectronic module, etc.

The carrier part 1 including the radiation-focusing device 8 is formed of a material which is likewise transparent both to the emitted radiation 7 and to the received radiation 13. For example, glass, plastic, sapphire, diamond or a semiconductor material which is transparent to the emitted radiation 7 and to the received radiation 13, are suitable for this purpose. In this regard, it is possible, for example, to make use of SiC for wavelengths $\lambda$>400 nm, of GaP for $\lambda$>550 nm, of GaAs for $\lambda$>900 nm, and of silicon for $\lambda$>1100 nm.

The radiation-focusing device 8 can, for example, be a positive lens with a spherical or aspherical surface which is produced through the use of etching or grinding. It is also possible to use a diffractive optical element, a holographic optical element or a Fresnel lens as the radiation-focusing device 8 which is produced through the use of etching, grinding or milling. The cutout 31 is produced, for example, through the use of etching or milling.

The cutout 31 can alternatively also be implemented through the use of two separately produced molded parts which are fastened on the carrier part 1 at a spacing from one another. Likewise, as an alternative to the above description, the radiation-focusing device 8 can also be produced separately and be fastened on the carrier part 1, for example through the use of a solder or adhesive that is transparent to radiation. If the carrier part 1 is formed, for example, of silicon, and the radiation-focusing device 8 of glass, these two components can also be interconnected through the use of anodic bonding.

In order, if necessary, to protect the active components of the optoelectronic module, that is to say the transmitting component 2, the receiving component 3 and the monitor diode 21, against environmental influences, the entire functional unit, including these three components and the prism cube 14, can be encapsulated by a potting sleeve formed essentially of plastic or of another sealing material, for example an epoxy resin or another suitable plastic. Likewise, the optoelectronic module according to the invention can have a hermetically tight metal housing with an optical window.

The optoelectronic module represented in FIG. 4 differs from that in accordance with FIG. 3 in that, in particular, the radiation-focusing device 8 is disposed on that side of the prismatic cube 14 situated opposite the transmitting component 2, and that the beam splitter layer 10 is constructed in such a way that it for the most part passes the emitted beam 7 and that it for the most part reflects the received beam 13. The beam axis 19 of the emitted beam 7 and the beam axis 20 of the received beam 13 run parallel to one another, in particular lie on one another. A beam axis 43 of the portion of the received radiation 13 reflected at the beam splitter layer 10 is perpendicular to the beam axis 19 of the received beam 13.

The transmitting component 2, the prismatic cube 14 and the radiation-focusing device 8 are fastened, for example by bonding or soldering, to a common carrier element 36 which is formed, for example, essentially of silicon. The carrier element 36 has a step 40 which separates a first mounting surface 37 and a second mounting surface 38, lying parallel to the latter, from one another.

The prismatic cube 14 is fastened on the first mounting surface 37 next to a shoulder surface 41 of the step 40 which is perpendicular to the mounting surfaces 37 or 38. The connecting device 29 that is used for this purpose need not be transparent to radiation. Furthermore, the radiation-focusing device 8 is fastened on the first mounting surface 37 with the aid of a connecting device 28 in such a way that the beam entry and beam entrance surface 18 of that device lies parallel to the third lateral surface 17 of the prismatic cube 14 and faces the latter. In this exemplary embodiment, a gap which is filled with a transparent coupling medium 26, for example synthetic resin, is present between the radiation-focusing device 8 and the prismatic cube 14. Likewise, of course, the radiation-focusing device 8 can also make physical contact with the prismatic cube 14, in particular it can bear directly against the latter.

The transmitting component 2 is fastened on the second mounting surface 38 in such a way that its beam entrance surface 11 faces the prismatic cube 14 and bears directly against the first lateral surface 5 of the latter. Of course, just as in the case of the exemplary embodiment of FIG. 3, it is possible for there to be present between the transmitting component 2 and the prismatic cube 14 a gap which, for the purpose of reducing reflection, is filled with a transparent coupling medium 24, for example synthetic resin, or for there to be physical contact.

Metallic coatings 42 are applied to the second mounting surface 38. These are connected in an electrically conducting fashion to electric contacts of the transmitting component 2. For this purpose, the transmitting component 2 and the metallic layers 42 are constructed, for example, in such a way that electric contacts of the transmitting component 2 and the metallic coatings 42 rest on one another and are connected to one another, for example through the use of a metallic solder or through the use of an electrically conducting adhesive. The metallic coatings 42 simultaneously serve as external electric terminals for the transmitting component 2, and are connected to a lead frame, for example through the use of bonding wires. Of course, it is likewise also possible for electric contacts of the transmitting component 2 to be connected through the use of bonding wires to the metallic coatings 42, or directly to a lead frame. A similar statement holds for the exemplary embodiment of FIG. 3. There, as well, corresponding metallic coatings 42 can be provided on the carrier part 1.

Consequently, in the case of the exemplary embodiment of FIG. 4, a stop filter 27 which is as far as possible opaque to the wavelength of the emitted beam 7 is disposed between the receiving component 3 disposed on the prismatic cube 14, and the prismatic cube 14. The crosstalk attenuation of the optoelectronic module can thereby be lowered. "Crosstalk" is to be understood as a direct transmission to the receiving component 3 of the signals emitted by the transmitting component 2. The stop filter 27 can optionally be applied to the receiving component beam entrance surface 12 or to the second lateral surface 6 of the prismatic cube 14. Furthermore, if necessary for optical reasons, a positive lens can be disposed between the receiving component beam entrance surface 12 and the prismatic cube 14.

If a laser diode is used as the transmitting component 2, it can be mounted with the active side upwards (up-side-up) or with the active zone downwards (up-side down), that is to say in the direction of the carrier element 36. In the second case, the thickness of the laser diode substrate must be very accurately adapted to the position of the beam splitter layer 10. This is associated with a high outlay for mounting and adjusting. In the first case, by contrast, only the thickness of the epitaxial layer of the laser diode, and the thickness of electric terminal metallic coatings 42 which may be present on the carrier element 36, come into this consideration. In this case, manufacturing tolerances can be kept very easily in the micrometer range and below. The adjustment is thereby conspicuously simplified. An analogous statement also holds, of course, for the exemplary embodiment of FIG. 3 described above.

If in the case of this exemplary embodiment, as well, a monitor diode 21 is provided, when seen from the prismatic cube 14, that diode can be disposed behind the transmitting component 2 on the second mounting surface 38. A portion of the radiation generated in the transmitting component 2 must then, of course, be coupled out rearwards. When a laser diode is used as the transmitting component 2 this is associated with a worsening of the laser parameters, since the rear resonator mirror also has to have a partially transparent construction. The exemplary embodiment of FIG. 3 does not have this disadvantage. In this case, the rear mirror of a laser diode used as the transmitting component 2 can be constructed for high reflection.

FIG. 5 shows a diagrammatically represented method sequence for simultaneously producing a plurality of optoelectronic modules according to the invention, in accordance with the exemplary embodiment of FIG. 3. A number of rectangular grooves 54 running parallel to one another at a spacing are produced on a first main surface 51 of a wafer 50. The section of the wafer 50 shown in FIG. 5 has four functional units, the two front ones being represented in section.

A number of radiation-focusing devices 8 are constructed in accordance with a prescribed array on a second main surface 61, situated opposite the first main surface 51, of the wafer 50. In this case, these are spherical or aspherical lenses which are produced, for example, through the use of etching or grinding. The radiation-focusing devices 8 are disposed in rows which run parallel to the grooves 54 and are situated opposite the latter at right angles. The wafer 50 is formed of a material which is transparent to the emitted beam 7 and the received beam 13. The description relating to FIG. 3 may be compared in this regard.

A prism ingot 52 having a square cross section is fastened in each groove 54 next to a first groove lateral surface 55. The first groove lateral surface 55 can serve in this case as an adjusting reference surface for a first lateral surface 5 of the prism ingot 52. Each prism ingot 52 has a beam splitter layer 10 which lies on a diagonal cut surface of the prism ingot 52 that is parallel to its longitudinal central axis. An angle α between the beam splitter layer 10 and the first main surface 51 of the wafer 50 is therefore 45°.

If the prism ingot 52 is formed, for example, of glass, and the wafer 50 of α-silicon, or vice versa, instead of the connection, specified above, with the aid of a connecting device 29, it is possible to use anodic bonding for the purpose of fastening the prism ingots 52 on the wafer 50. In this technique, the surfaces to be connected are laid on one another, for example heated to approximately 450° C. and a voltage of approximately −1000 V is applied between the glass and silicon. This connecting technique is also possible whenever the wafer 50 is formed of glass or another material of whatever sort, and has an a-silicon layer at the connecting point to the prism ingot 52. All that is required is for a glass layer and an a-silicon layer to rest on one another. A plurality of transmitting components 2 are fastened on the first main surface 51 of the wafer 50 next to the first lateral surfaces 5 in such a way that electric contacts of the transmitting components 2 come to lie on the metallic coatings 42, which are provided for this purpose and applied to the first main surface 51 of the wafer 50, and are connected thereto in an electrically conducting fashion. In this case, the lateral surface 5 can serve in each case as an adjusting reference surface for the transmitting components 2. The transmitting components 2 are disposed in such a way that each is assigned a radiation-focusing device 8.

In order to ensure reliable separation of the p-contacts and n-contacts of laser diode transmitting components, and/or to avoid damage to the ridge in the case of the use of lasers with ridge waveguides (MCRW lasers), before the transmitting components 2 are mounted a separating groove is constructed in each case, for example etched in, between the metallic coatings 42.

A plurality of receiving components 3 with electric contacts 56 are fastened in each case on the second lateral surfaces 6 of the prism ingots 52. The contacts are also disposed in such a way that a radiation-focusing device 8 is assigned to each.

In a way similar to this, a plurality of monitor diodes 21 with electric contacts 56 are fastened in each case next to a fourth lateral surface 22 situated opposite the first lateral surface 5.

In the case of the use of laser diodes as transmitting components 2, the latter can be connected in series on the first main surface 51 of the wafer 50 through the use of metallic tracks 57 (illustrated by dashes in FIG. 5). Therefore, contact must be made only in each case with the two outer contact surfaces 42, disposed at the two ends of individual laser diode rows 58, for the so-called burn-in of the laser diodes. The burn-in for the laser diodes assigned to the same laser diode row 58 can therefore be carried out simultaneously in a particularly simple way. Moreover, the individual transmitting components 2 and receiving components 3 can also have their electro-optic parameters measured by making contact with the associated metallic coatings 42, 56 and making a connection to a suitable wafer tester in the wafer assembly, that is to say during use. Of course, the same also applies to the monitor diodes 21.

After these method steps, the wafer 50 and the prism ingots 52 are then severed along first separating lines 59, which run between the individual transmitting components 2 perpendicular to the grooves 54, and the wafer 50 is severed along second separating lines 60, which run in each case between two grooves 54. The individual devices that are thus fabricated and are shown in the lower part of FIG. 5, in each case have a transmitting component 2, a receiving component 3, a monitor diode 21, a prismatic cuboid 14 and a radiation-focusing device 8 with a carrier part 1. The devices are subsequently further processed depending on the envisaged field of use, for example fastened on a lead frame and provided with a potting sleeve 35.

We claim:

1. A method for producing at least one beam splitter molded part which is transparent to electromagnetic radiation and in which a beam splitter layer is embedded, which comprises the following method steps:
    a) producing a first wafer formed of radiation-transparent material and having a main surface;
    b) applying a beam splitter layer to the main surface of the first wafer;
    c) applying a second wafer formed of radiation-transparent material to the beam splitter layer;
    d) severing the second wafer and incipiently sawing the beam splitter layer along mutually parallel separating lines with a separating tool having a V-shaped cutting profile, to produce mutually separate first wafer strips and an assembly including the first wafer, the second wafer and the beam splitter layer;
    e) fastening the assembly on a carrier plate with the first wafer strips facing the carrier plate;
    f) severing the first wafer and the beam splitter layer along the mutually parallel separating lines with a separating tool having a V-shaped cutting profile to produce second wafer strips separated from one another and situated opposite the first wafer strips, and thus to construct mutually separate beam splitter molded part ingots having a desired cross-sectional shape of the beam splitter molded part in bars having a longitudinal axis; and
    g) severing the bars transverse to the longitudinal axis.

2. The method according to claim 1, which comprises after the severing of the second wafer and incipient sawing of the beam splitter layer, at least one of grinding and polishing cut surfaces of the first wafer strips, and after the severing of the first wafer and the beam splitter layer, at least one of grinding and polishing cut surfaces of the second wafer strips.

3. The method according to claim 1, which comprises providing the beam splitter layer with a WDM layer sequence.

4. The method according to claim 1, which comprises using a glass wafer as the second wafer, forming a silicon sublayer of the beam splitter layer, bordering the sublayer on the glass wafer, and connecting the glass wafer to the beam splitter layer by anodic bonding.

5. In an optoelectronic module for bidirectional optical data transmission with an optical device coupled optically to the optoelectronic module by using a beam splitter molded part produced according to claim 1, the improvement comprising:
    a transmitting component for emitting a beam of radiation;
    a receiving component for receiving radiation; and
    a radiation-focusing device for focusing radiation;
    said transmitting component, said receiving component, said radiation-focusing device and said beam splitter molded part constructed and mutually disposed for coupling at least a portion of the beam emitted by said transmitting component during operation of the optoelectronic module into the optical device, and for coupling at least a portion of a received beam coupled out of the optical device into said receiving component.

6. The optoelectronic module according to claim 5, wherein said beam splitter molded part has the shape of a cuboid, said beam splitter layer lies in a diagonal cut surface of said cuboid, and a cut surface of the cuboid lying perpendicular to said beam splitter layer has the shape of a rectangle or a square.

7. The optoelectronic module according to claim 5, wherein:
    said beam splitter molded part has at least a first lateral surface, a second lateral surface and a third lateral surface;
    said first lateral surface and said second lateral surface are inclined relative to one another;
    said third lateral surface is inclined relative to one of said first and second lateral surfaces and opposite the other of said first and second lateral surfaces;
    said transmitting component has a transmitting component beam entrance surface facing said first lateral surface;
    said receiving component has a receiving component beam entrance surface facing said second lateral surface;
    said beam-focusing device has a beam entry and beam exit surface facing said third lateral surface; and said beam splitter layer intersects both a beam axis of the emitted beam and a beam axis of the received beam.

8. The optoelectronic module according to claim 7, wherein:

said first lateral surface and said second lateral surface are mutually perpendicular; and said third lateral surface is mutually perpendicular with one of said first and second lateral surfaces and mutually parallel and opposite the other of said first and second lateral surfaces.

9. The optoelectronic module according to claim 7, wherein:

said transmitting component beam entrance surface of said transmitting component is connected to said first lateral surface;

said receiving component beam entrance surface of said receiving component is connected to said second lateral surface; and said beam entry and exit surface of said radiation-focusing device is connected to said third lateral surface.

10. The optoelectronic module according to claim 5, wherein:

said radiation-focusing device has a carrier part formed substantially of a material transparent to the emitted radiation and the received radiation;

a radiation-transparent connecting device connects said carrier part to said beam splitter molded part; and said transmitting component and the optical device are disposed on different sides of said carrier part.

11. The optoelectronic module according to claim 7, wherein:

said beam splitter molded part has a fourth lateral surface;

a monitor diode has a monitor diode beam entrance surface facing said fourth lateral surface; and said beam splitter layer is partially transparent to the emitted radiation for permitting a first portion of the emitted radiation to strike said monitor diode beam entrance surface.

12. The optoelectronic module according to claim 7, wherein:

the beam axis of the emitted radiation and the beam axis of the received radiation are substantially parallel;

said beam splitter layer is constructed and disposed for passing a portion of the transmitted radiation to be coupled into the optical device and for the most part reflecting and deflecting the received radiation towards said receiving component; and said radiation-focusing device and said transmitting component are disposed on opposite sides of said beam splitter molded part.

13. The optoelectronic module according to claim 7, wherein:

the beam axis of the transmitted radiation and the beam axis of the received radiation enclose an angle of 90°; and said beam splitter layer is constructed and disposed for at least mostly reflecting the emitted radiation, causing a beam axis of the reflected radiation to run parallel to the beam axis of the received radiation, and for passing at least a portion of the received radiation, causing the received radiation to strike said receiving component beam entrance surface.

* * * * *

UNITED STATES PATENT AND TRADEMARK OFFICE
CERTIFICATE OF CORRECTION

PATENT NO. : 6,028,708  
DATED : February 22, 2000  
INVENTOR(S) : Wolfgang Gramann, et al.

Page 1 of 1

It is certified that error appears in the above-identified patent and that said Letters Patent is hereby corrected as shown below:

Item [30]  
Should read as follows:

Sept.30, 1996   [DE]   Germany .......... 196 40 236.0

Signed and Sealed this

Twenty-eighth Day of August, 2001

Attest:

NICHOLAS P. GODICI  
Attesting Officer          Acting Director of the United States Patent and Trademark Office